United States Patent [19]

Nubson

[11] Patent Number: 4,695,850

[45] Date of Patent: Sep. 22, 1987

[54] CARD GUIDE APPARATUS FOR USE IN A NON-INPACT PRINTER

[75] Inventor: Richard C. Nubson, Eden Prairie, Minn.

[73] Assignee: Data Card Corporation, Minnetonka, Minn.

[21] Appl. No.: 769,841

[22] Filed: Aug. 26, 1985

[51] Int. Cl.[4] ........................ G01D 15/10; H05B 1/00; B41J 3/20

[52] U.S. Cl. ................................ 346/76 PH; 219/216; 400/120

[58] Field of Search ............ 346/76 PH; 219/216 PH; 400/120

[56] References Cited

U.S. PATENT DOCUMENTS 4,480,933 11/1984 Shibayama .......................... 400/120

*Primary Examiner*—E. A. Goldberg
*Assistant Examiner*—Mark Reinhart
*Attorney, Agent, or Firm*—Faegre & Benson

[57] ABSTRACT

A thermal transfer printer for printing on the face of a plastic card such as a credit card. The apparatus employs a spring loaded support and capstan roller for bending the card to conform to the surface of a printer roller and for forcing thermal elements of a print head into pressure applying contact with a thermal transfer foil sheet and the surface of the card at a printing station. The printing is applied by selectively heating individual thermal elements to transfer thermally transferable printing material from the carrier sheet to the surface of the card. The apparatus also employs a structure for stripping the thermal transfer foil from the surface of the card.

9 Claims, 8 Drawing Figures

CARD GUIDE APPARATUS FOR USE IN A NON-INPACT PRINTER

BACKGROUND OF THE INVENTION

1. Field of the Invention.

This invention relates to nonimpact thermal printing apparatus for recording information on plastic card stock such as plastic credit cards.

2. Description of the Prior Art.

A number of systems exist for recording visual information such as characters or symbols onto sheet material such as paper or similar lightweight materials. A common system of applying the information is through the use of thermal print heads utilizing thin or thick film semi-conductor material as shown in U.S. Pat. No. 3,496,333. That patent shows print elements which have a semi-conductor substrate formed with a plurality of thermally independent elements or islands which project slightly from a semi-conductor substrate. Each independent element includes a semi-conductor heating section which can be individually selected using known circuit means to cuse the individual elements to heat in a pattern which is to be printed.

In U.S. Pat. No. 3,855,448 such a print head is shown in a printer which applies printed information to recording paper free of thermal sensitive material. A printing foil is used which has a heat resistant backing layer upon which a thin film of adhesive resin of a low melting point is disposed. The foil is positioned between the thermal head and recording paper. The print head selectively melts portions of the adhesive resin and releases them from the backing layer to thereby transfer molten resin to the recording paper to accomplish printing on the recording paper. Although such printers have found widespread use for applying printed material to conventional recording paper, they have not been used heretofore in printing on relatively thick and inflexible materials such as plastic credit cards, for example.

SUMMARY OF THE INVENTION

The present invention is directed to the presentation of thermal transfer printing apparatus for printing on the face of a plastic card in which the apparatus comprises a print roller mounted on a base and rotatable about an axis perpendicular to the base, a card means mounted on the base for slideably supporting a card having its face perpendicular to the base and delivering the card therethrough to a printing station adjacent to the surface of the first cylindrical roller. The apparatus also includes a thermal transfer foil sheet supported for movement in contact with the face of the card as it passes the printing station. A capstan roller rotatable about an axis perpendicular to the base is mounted upon a spring loaded support structure which is in turn mounted on the base for urging the capstan roller into pressure applying contact with the face of the card beyond the printing station thereby curving a portion of the face of the card to conform to the print roller through the printing station. The apparatus includes a print head mounted on the spring loaded support structure which has at least one row of thermal elements projecting above a planar surface where the row of thermal elements is aligned with the axis of the first roller and arranged to contact the carrier sheet in the printing station. When selected thermal elements of the print head are energized, printing material is transferred from the adjacent portions of the transfer foil sheet to the face of the card.

It is therefore an object of the present invention to present a thermal transfer printing apparatus which is suitable for applying printed material to the face of a plastic card. It is another object of the present invention to present a thermal transfer printing apparatus where the thermally transferable printing material is stripped from the card as it leaves the printing station.

It is yet a further object of the present invention to present a thermal transfer printing apparatus wherein structure is provided for maintaining the transfer foil sheet in tension to facilitate its being stripped from the surface of the plastic as the card leaves the printing station.

BRIEF DESCRIPTION OF THE DRAWINGS

The invention will become more fully apparent from the following detailed description taken in conjunction with the accompanying drawings, in which.

DETAILED DESCRIPTION OF THE PREFERRED EMBODIMENTS

Figures 1, 2:
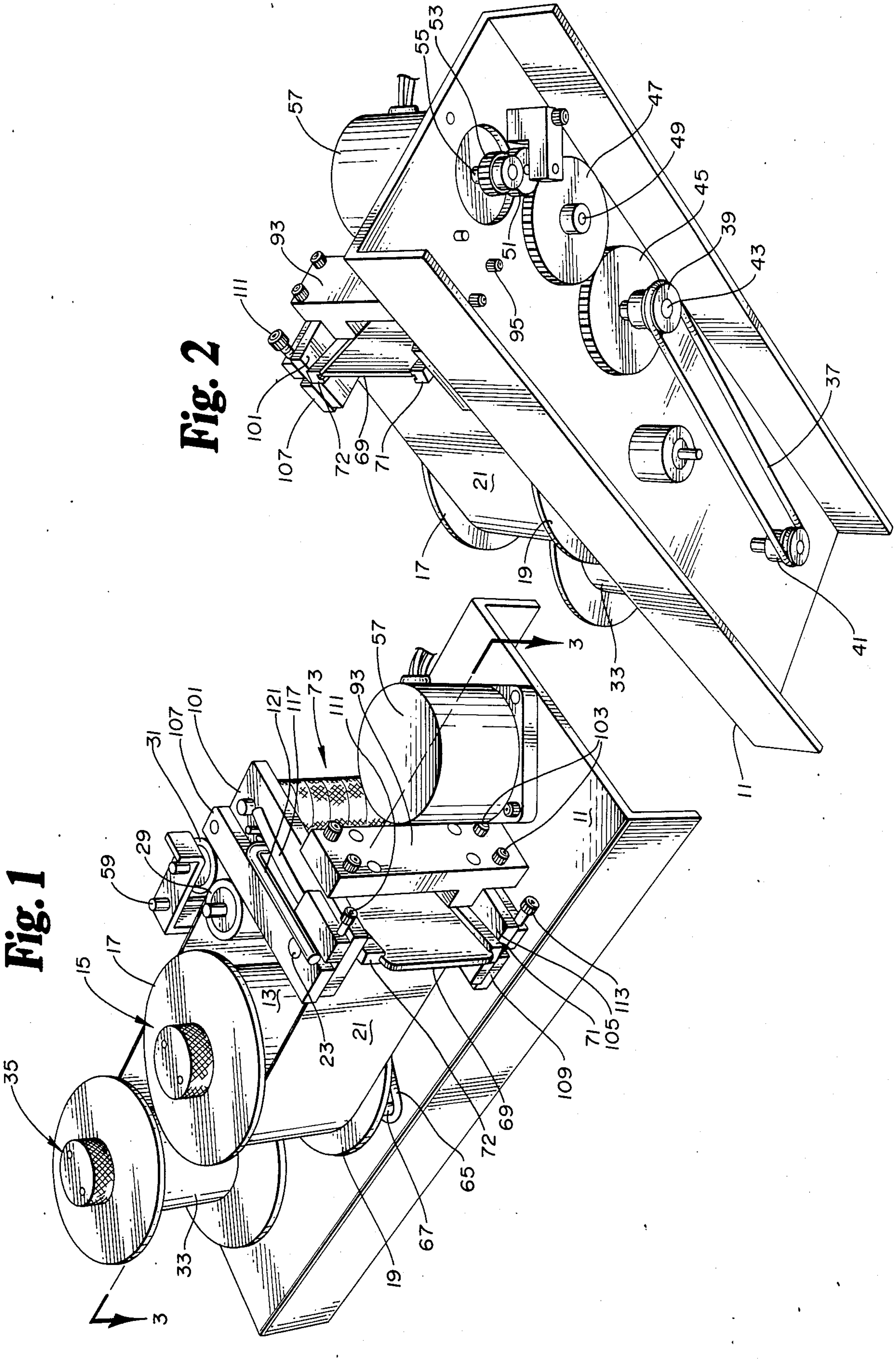
FIG. 1 is a perspective view showing the top front and right side of a thermal transfer printing module according to the present invention in which plastic cards can be manually inserted and driven through the printing apparatus under the control of a stepper motor.
FIG. 2 is a perspective view as viewed from the bottom front and right side and particularly showing the drive mechanism for the drive and tension rollers.
Figure 3:
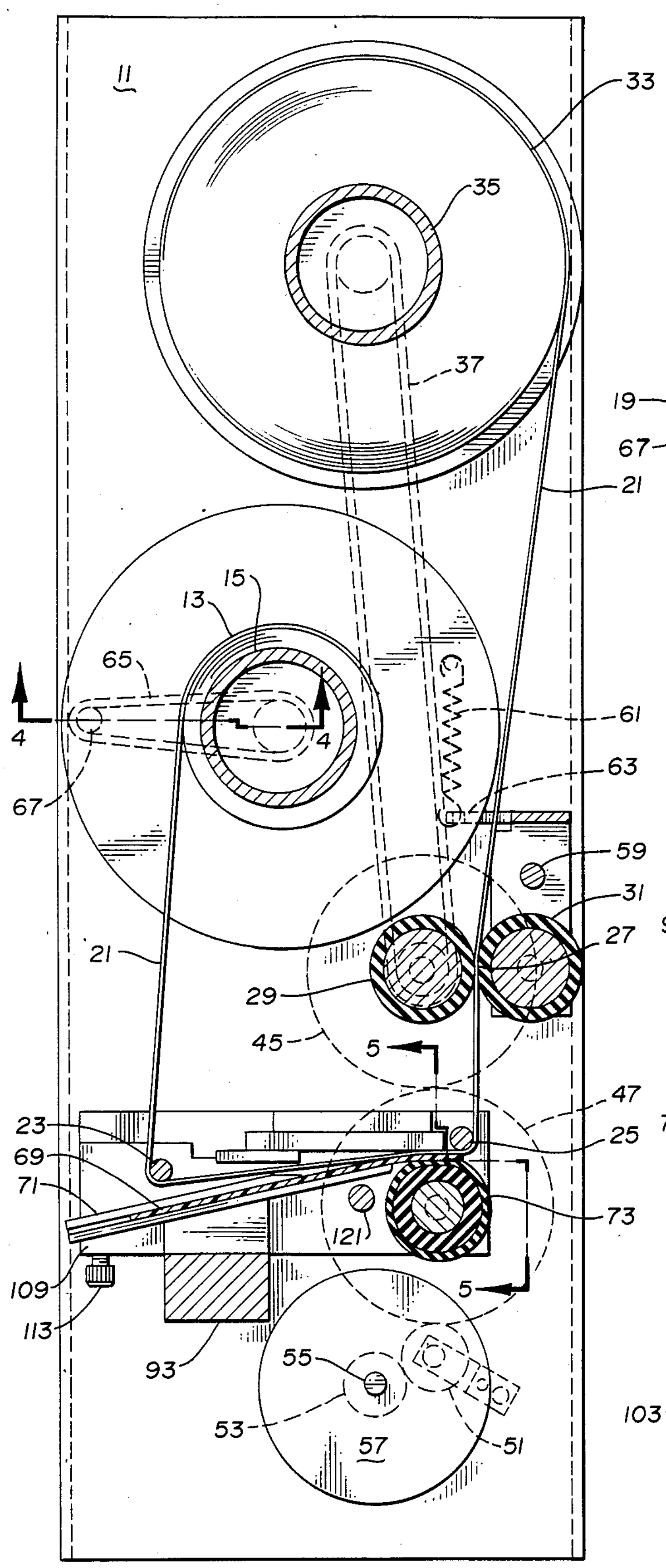
FIG. 3 is a top plan view of the printing apparatus particularly showing a card moving through the card guide into the printing station.
Figure 4:
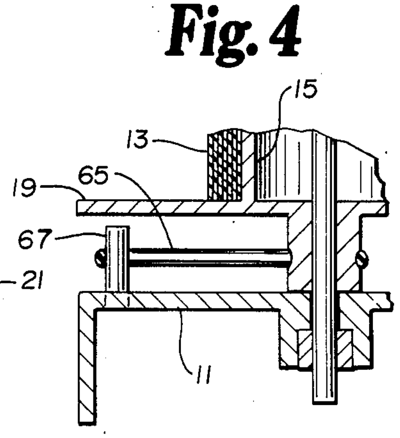
FIG. 4 is a sectional front elevation view taken along line 4—4 of FIG. 3.

Referring to FIG. 1, there is shown an embodiment of the thermal printing apparatus according to the present invention which includes a base 11 upon which a supply roll 13 of thermally sensitive material coated on a polyester ribbon is spooled. The roll has a central hub 15 and top and bottom plates 17 and 19 which protect the roll of the thermally transferable printing material. A web 21 of the ribbon or film extends from supply spool 13 and over a first idler roller 23. In the preferred embodiment of the printer as shown, the supply roll 13 of film is rotatable about an axis perpendicular to the surface of base 11. In order to prevent wrinkling of foil 21 as it moves along its path, it is important that all of the rollers over which it passes and the supply and take-up spools are all aligned parallel to each other.

The thermally sensitive material coated on the polyester ribbon 21 is often also described as a foil. It includes a polyester protective layer, a release layer, a pigment layer, and a bonding layer. When the polyester film is heated by a heating element the pigment is released from the polyester film backing and forms an adhesive bond to the surface in contact with the film. The types of films which are used for thermally applying the topping pigmentation to raised embossed characters on credit cards works well in the thermal printer shown herein. Such foils are available from several commercial sources including Admiral Coatings in Minaki, N.J.

After foil 21 changes direction by passing around roller 23 it again changes direction by passing over capstan roller 25 which is also rotatably mounted on base 11 on suitable bearings and aligned parallel to the axes of rollers 23 and hub 15. After passing over capstan 25, film 21 passes through the nip 27 between an overrunning roller 29 and a pinch roller 31 which are both cylindrical rollers having equal diameters in the preferred embodiment shown and which are also carefully aligned with their rotational axes parallel to rollers 23 and 25. The radius of roller 29 is slightly larger than that of roller 73. Since they are driven at the same rotational rate they will apply tension to foil 21 to strip it from card 69. The pinch force from spring 61 is set so that there will be a predetermined tension on film 21 as roller 29 slips against it. The web of foil 21 is then fed on to a take-up roll 33 wound onto a hub 35 which is pivotally mounted on base 11.

Foil 21 is moved through the printer by an O-ring belt 37 which is driven by a hub 39 which receives its drive power as discussed below. Belt 37 drives pulleys 41 and in turn drives take-up hub 35. The connection between O-ring belt 37 and pulley 41 is not high friction to avoid an excessive tension being placed on film 21 as it is wound onto the take-up roll 33 as hub 35 is driven.

Pulley 39 is mounted on shaft 43 which is also the axis of roller 29. A gear 45 is driven by a complimentary drive gear 47 rotatable around a shaft 49 and which is in turn driven through an intermediate gear 51 by a drive gear 53 mounted on the output shaft 55 of stepper motor 57. Motor 57 receives input control signals on cable 53 which cause incremental rotation of the shaft of motor 51 to drive rollers 27 and 29 to extract foil 21 from supply reel 13 and in turn cause rotation of hub 35 to wind the foil passing through nip 27 of rollers 29 and 31 onto take-up reel 33. Roller 31 acts as a pinch roller since it is pivotally mounted about pivot 59 and biased into engagement with foil 21 and overrunning roller 29 by the action of tension spring 61 which is connected at one end to lever arm 63. The other end of spring 61 is connected to base 11. Roller 31 can readily be pivoted away from roller 20 to allow foil 21 to be inserted, for example.

In order to maintain foil 21 from supply reel 13 to the nip 27 of rollers 29 and 31 under tension, an O-ring drag belt 65 is connected between a post 67 mounted on base 11 and hub 15. The friction between belt 65 and post 67 as supply reel 13 is rotated provides a steady drag to provide tension to foil 21.

In FIG. 1, a card 69 is shown inserted in the card guide formed by a grooved lower guide segment 71 and a grooved upper guide segment 73. Card 69 is supported with its face perpendicular to the surface of base 11 so that it is aligned parallel to the surface of foil 21. In the embodiment of the invention shown herein, card 69 is manually inserted into the grooves in guide segments 71 and 73 although other means could be used to automatically feed cards 69 into the card guide formed from guide members 71 and 73. The grooves in guide members 71 and 73 support card 69 until it enters the nip between idler roller 26 and a printer or pressure roller 73.

As print roller 73 is driven by gear 47 through shaft 49 which is rotatably mounted on appropriate bearings 75, the leading edge of card 69 is deflected from the straight line card transfer path defined by grooved guides 71 and 73 by striking the edge of print head 75 which deflects the leading edge of card 69 into the nip between capstan roller 25 and print roller 73.

Print head 75 is a commercially available thermal transfer print head useful for paper printing application. Thermal transfer print heads are available both in "edge" types where thermal elements project from a planar surface as a row of islands positioned near one edge of the substrate or "center" types. In center type transfer print heads the substrates have the row or rows of thermal elements or dots down the center of the substrate with electronic circuitry on both sides of the row of thermal elements. In the printer shown herein, an edge type print head 75 is utilized. The thermal elements are located as viewed in FIG. 1 near the right hand edge of print head 75 and arrayed in a line or entered perpendicular to base 11 in a printing area where the back face of card 69 is supported by roller 73 and forced into a curved configuration conforming to the surface of roller 73 by pressure applied from the edge of print head 75 and capstan roller 35 which contacts the face of card 69 as it leaves the printing station. Foil 21, after it passes roller 23, is on a converging path with card 69 until it reaches the printing station where it is brought in contact with the face of card 69 and where it is contacted by the thermal elements of print head 75 which, when selectively energized, release selected dots of pigmented material combineable to form a printed image on the face of card 69.

Figure 5:
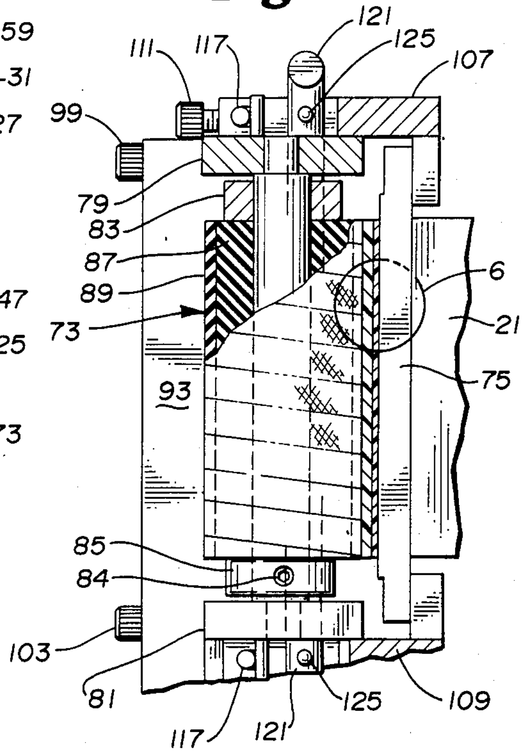
FIG. 5 is a sectional right side elevation view taken along 5—5 of FIG. 3.

In order to obtain a high quality printed image on the face of card 69, it is necessary that adequate pressure be applied to print head 75 in the printing station. In order to accomplish this, the printer shown herein includes provisions for applying appropriate pressure at the printing station. Roller 73 is mounted on a shaft 77 which is pivotally mounted on bearing 79 and 81 as shown in FIG. 5. Upper and lower hub projections 83 and 85 are shown above and below a foam rubber core 87 which surrounds shaft 77. A set screw 84 secures the roller material to the shaft. The torsional stiffness of the roller 73 is enhanced by binding the relatively soft, i.e. 45 durameter rubber core 87 with a reinforced fabric and rubber ribbon 89 which provides a torsionally stiff but yielding roller providing an excellent back-up support to card 69 at the printing station when pressure is applies by the print head 75, to the foil 71, card 69, and roller 73 combination. the torsional stiffness assures uniform print spacing as roller 73 is rotated during printing. Roller 73 could be molded with reinforcing material near the surface rather than wrapping with tape.

Figure 6:
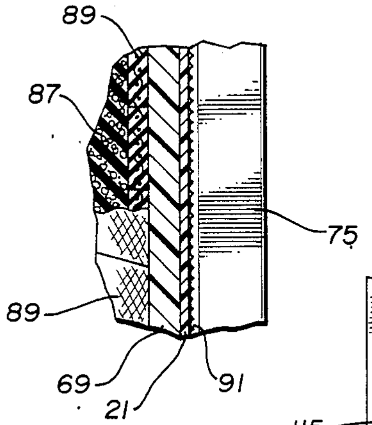
FIG. 6 is a greatly enlarged detail taken from the area encircled at character 6 of FIG. 5 and further broken away.

FIG. 6 shows in greatly enlarged detail the area encircled at 6 of FIG. 5 and further broken away. Print head 75 is shown with the individual thermal elements 91 projecting from its surface and contacting foil 21 which is in close engagement with the face of card 69 which is in turn supported by the fabric reinforced rubber ribbon 89 which forms the outer covering for the foam core of roller 73.

The portion of the printer responsible for producing the pressure between roller 73 and print head 75 will now be discussed. A vertical standard or support 93 is rigidly mounted on base 11 by a pair of bolts 95 which may be seen in FIG. 2. A pair of bolts 99 affix an upper mount 101 near the top of standard 93 while a pair of bolts 103 affix a lower support mount 105 to standard 93. The support guides 71 and 73 are affixed to the surfaces of support mounts 105 and 101 respectively.

The thermal print head 75 is connected between thermal print head mounting supports 107 and 109 both of which are pivotally mounted about shaft 23. Set screws 111 and 113 respectively are used to adjust the printing pressure as described more fully below.

The thermal print hardware mounting frames 107 and 109 are pivotable about point 115. A leaf spring 117 which is anchored on thermal print hardware mounting support 107 projects outwardly therefrom and engages a pin 119 mounted on mounting support 101 at the top of the printer. A similar leaf spring and pin arrangement is utilized at the bottom of the printer to bias thermal print hardware mounting frame 109. The leaf springs tend to rotate mounting supports 107 and 109 clockwise as viewed from the top of FIG. 7 and 8, for example, to urge the right hand edge of print head 75 into pressure applying contact with the surface of roller 73 as shown by tightening set screw 111 the spring rate of the mounting support 107 can be adjusted.

Figure 7:
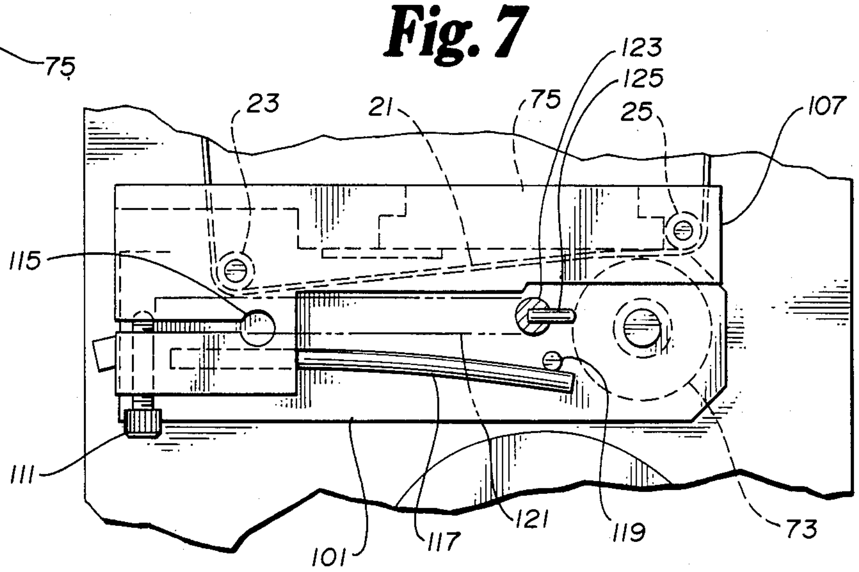
FIG. 7 is a partial top plan view showing the thermal printing station illustrated in the top plan view of FIG. 3 without a card being present.
Figure 8:
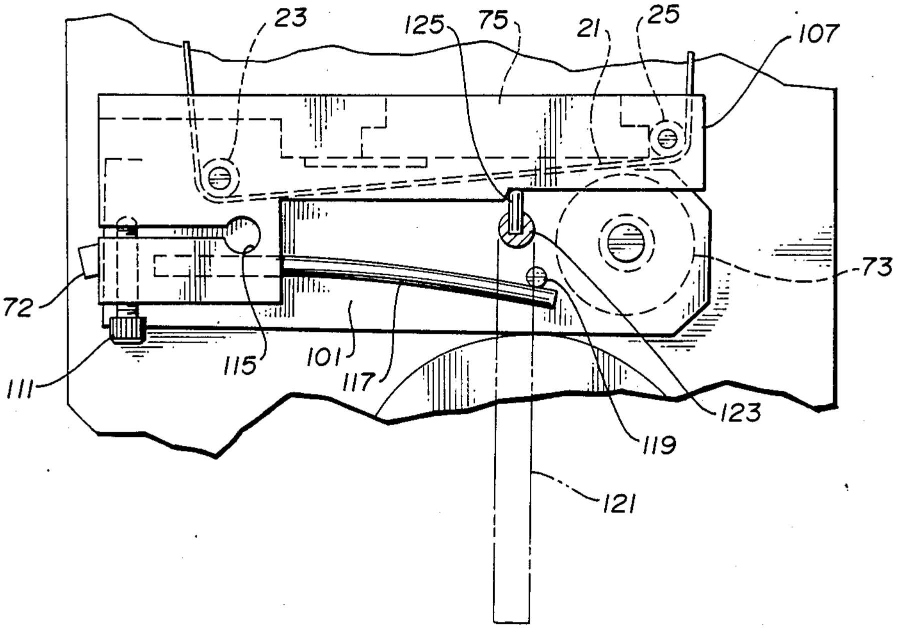
FIG. 8 is a view similar that in FIG. 7 with some elements cammed into position to hold the pressure roller away from the carrier sheet and print head.

In order to allow the print head 75 to be moved away from the surface of roller 73, a camming structure is provided. As shown in FIGS. 1, 7, and 8, a handle 121 is aligned parallel to the top surface of plate 107. That structure has a right angle bend which passes through support 101 through aperture 123. A projecting cam lobe 125 engages plate 107 when arm 121 is moved from the position shown in FIG. 7 to the position shown in FIG. 8 thereby pivoting mounting plate 107 counterclockwise from the position shown in FIG. 7 to the posistion in FIG. 8 to move the edge of print head 75 away from the surface of roller 73. When the corresponding cam and arm arrangement at the base of the machine is used to move plate 109, the foil can be reloaded for example, without interference by moving print head 75 away from roller 73.

In the embodiment shown in this application, leaf spring 117 may be a tempered stainless steel shaft having a hardness of approximately 45 Rockwell C. The two springs have sufficient spring rate to apply a printing force between 25 and 30 pounds on a consistent basis between print head 75 and roller 73 in order to facilitate the application of an appropriate amount of force between foil 21 and the face of card 69 to assure the bending of the card to engage the curved surface thereof with the projecting thermal elements 91 of print head 75. The 25 to 30 pound printing force also causes foil 21 to make sufficiently close contact with the surface of the card to assure adequate heat flow to release the pigment from the film backing of foil 21 and assure a good bond to the face of card 69 without causing the backing of foil 21 to melt and totally bond to the surface of the card. The third function of the printing force is to provide adequate frictional coupling between the surface of roller 73 and the rear face of the card to assure adequate driving friction with the card as it moves through the printing station. Because the thermal print elements project slightly from the surface of the printhead 75, each time they are energized, they tend to form a depression in the surface of card 69, where they tend to remain when motor 57 steps to drive the card to the next location. Adequate frictional coupling between roller 73 and card 69 is critical to provide sufficient force to drive the thermal elements out of the depressions and across the surface of the card to the next print location.

In the preferred embodiment shown, the dot size of the thermal elements 91 of print head 75 is 0.005 inches wide by 0.010 inches long so that two dots must be energized to produce a 0.01 inch by 0.01 inch pixel. Typically the thermal elements 91 are energized for two milliseconds and off for two milliseconds with a card print head requiring about two milliseconds to acheive maximum temperature and about two milliseconds to cool down.

Print head 75 is a commercially available edge type print head for paper available from Gulton Industry in Providence, R.I., or from Rohm Incorporation in Kyoto, Japan. A typical thermalprint unit has a dot print density of 100 dots per inch with a total of 224 dots across the surface of head 75.

Stepper motor 57 which drives card 69 past print head 75, provides the drive for all of the printing functions. The number of steps utilized and the gear ratio of the various drive gears are determined by the required spacing between print lines. Using a 200 step motor and 3.6:1 gear ratio each step can provide 0.005 inches of movement of the card using a one-inch diameter rollers.

In the preferred embodiment shown it has been found about 5 ounces of drag is appropriate for keeping foil 21 taut as it leaves supply roll 13.

What is claimed is:

1. Thermal transfer printing apparatus for printing on the face of a plastic card, comprising:

a base;

a print roller mounted on the base and rotatable about an axis perpendicular to the base;

card guide means mounted on the base for slidably supporting a card having its face perpendicular to the base and delivered therethrough to a printing station adjacent the surface of the print roller;

a thermal transfer foil sheet supported for movement in contact with the face of the card as it passes through the printing station, the sheet bearing thermally transferrable printing material on the surface thereof;

a capstan roller rotatable about an axis perpendicular to the base;

spring loaded support means upon which the capstan roller is mounted, the spring loaded support means mounted on the base for urging the capstan roller into pressure applying contact with the face of the card beyond the printing station thereby curving a portion of the face of the card to conform to the print roller through the printing station; and a print head mounted on the spring loaded support means and having at least one row of thermal elements projecting above a planar surface, the row of thermal elements being aligned with the axis of the print roller and arranged for contacting the carrier sheet in the printing station thereby enabling selected thermal elements of the print head when energized, to transfer printing material from portions of the transfer foil to the face of the card.

2. The apparatus of claim 1 wherein the foil sheet is stripped from the face of the card after it leaves the printing station by foil sheet stripping means.

3. The apparatus of claim 2 wherein the foil sheet stripping means includes a pair of driven rollers mounted on the base and positioned for drawing the foil sheet over the foil guide roller and adapted for maintaining tension on the foil sheet to separate it from the face of the card as it leaves the printing station.

4. The apparatus of claim 3 wherein the feed rate of the pair of driven rollers of the foil sheet stripping means exceeds the feed rate of the print and foil guide rollers thereby placing the foil sheet under tension as it is separated from the card.

5. The apparatus of claim 4 which also includes a foil take-up roll wherein the means for driving the foil take up roll is coupled to the drive means for the printing and foil stripping rollers with a slippable coupling to allow only a predetermined amount of tension to be applied to the foil sheet.

6. The apparatus of claim 1 wherein the print roller is provided with an elastic surface.

7. The apparatus of claim 5 wherein the elastic surface has high torsional stiffness.

8. The apparatus of claim 7 wherein the print roller has a rubber core and a fiber reinforced outer layer to increase its torsional stiffness.

9. The invention of claim 1 wherein the spring biased support means applies approximately 25 to 30 pounds of force through the print head to the foil sheet and the face of the card at the printing station thereby assuring the proper bending of the card, adequate heat transfer through the carrier sheet to the face of the card, and providing sufficient driving force to the card surfaces in the nip between the drive and foil guide rollers to frictionally drive the card through the printing station and past the print head.

* * * * *